United States Patent [19]
Randall

[11] 3,764,030
[45] Oct. 9, 1973

[54] SIDE MOUNT LOADING PLATFORM FOR VAN TYPE TRUCK

[75] Inventor: Francis R. Randall, Mount Gilead, Ohio

[73] Assignee: Harsco Corporation, Camp Hill, Pa.

[22] Filed: Dec. 29, 1971

[21] Appl. No.: 213,407

[52] U.S. Cl. .............................................. 214/77 P
[51] Int. Cl. ............................................. B60p 1/48
[58] Field of Search ...................... 214/130 R, 77 R, 214/77 P

[56] References Cited
UNITED STATES PATENTS

| 3,258,139 | 6/1966 | Ridgeway | 214/77 P |
| 2,843,277 | 7/1958 | Brannan | 214/77 P |
| 3,451,572 | 6/1969 | Rossoni | 214/77 P X |

Primary Examiner—Robert G. Sheridan
Assistant Examiner—Frank E. Werner
Attorney—Palmer Fultz

[57] ABSTRACT

A side mount loading platform for van type trucks wherein the loading apparatus is mounted on the side of the chassis frame with said loading apparatus completely enclosed within the confines of the side panels and loading door of the vehicle. As another aspect, when the loading apparatus is disposed in an upper storage position it functions to form a closure that registers with a cut-out in the truck floor.

8 Claims, 5 Drawing Figures

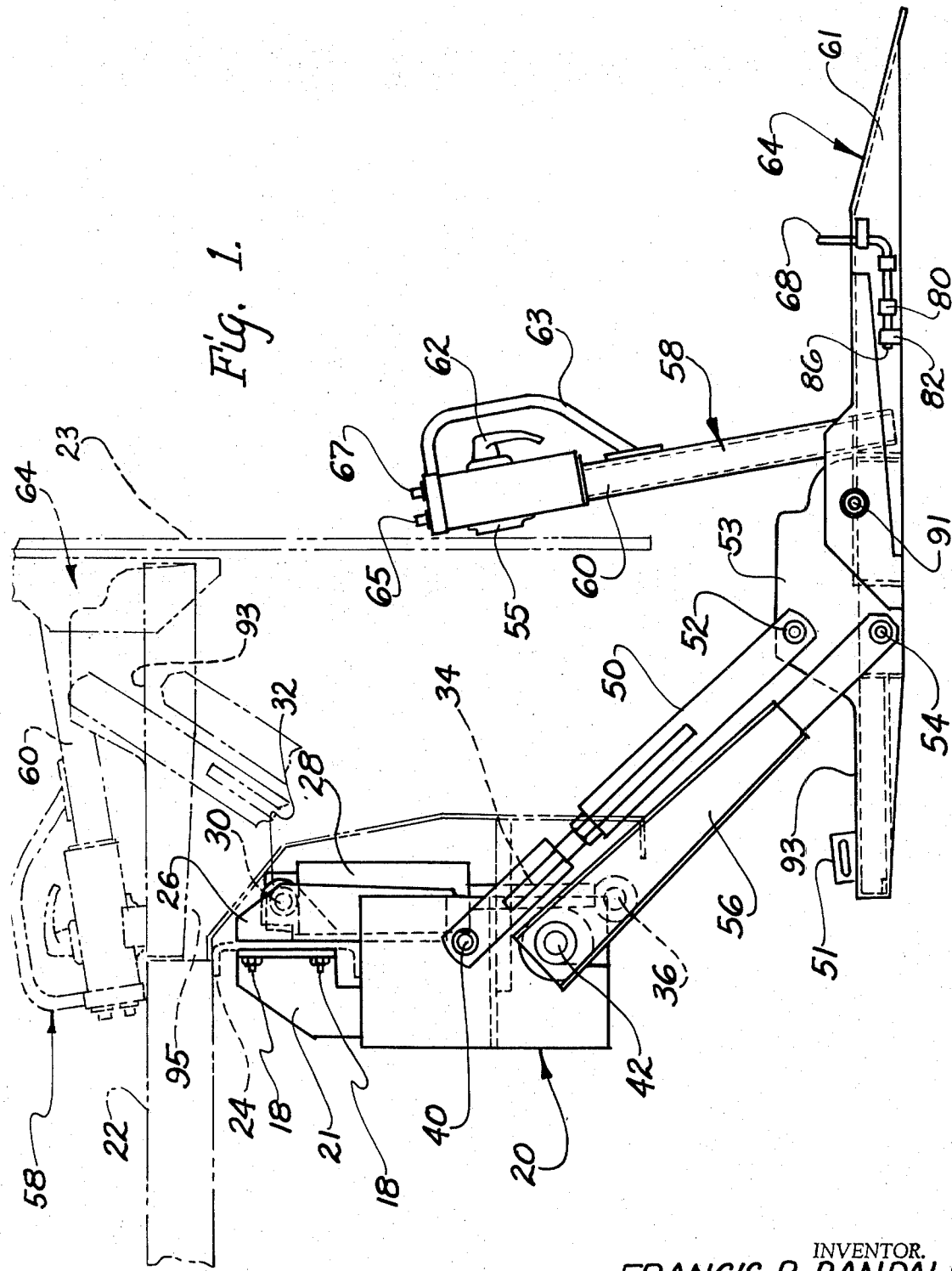

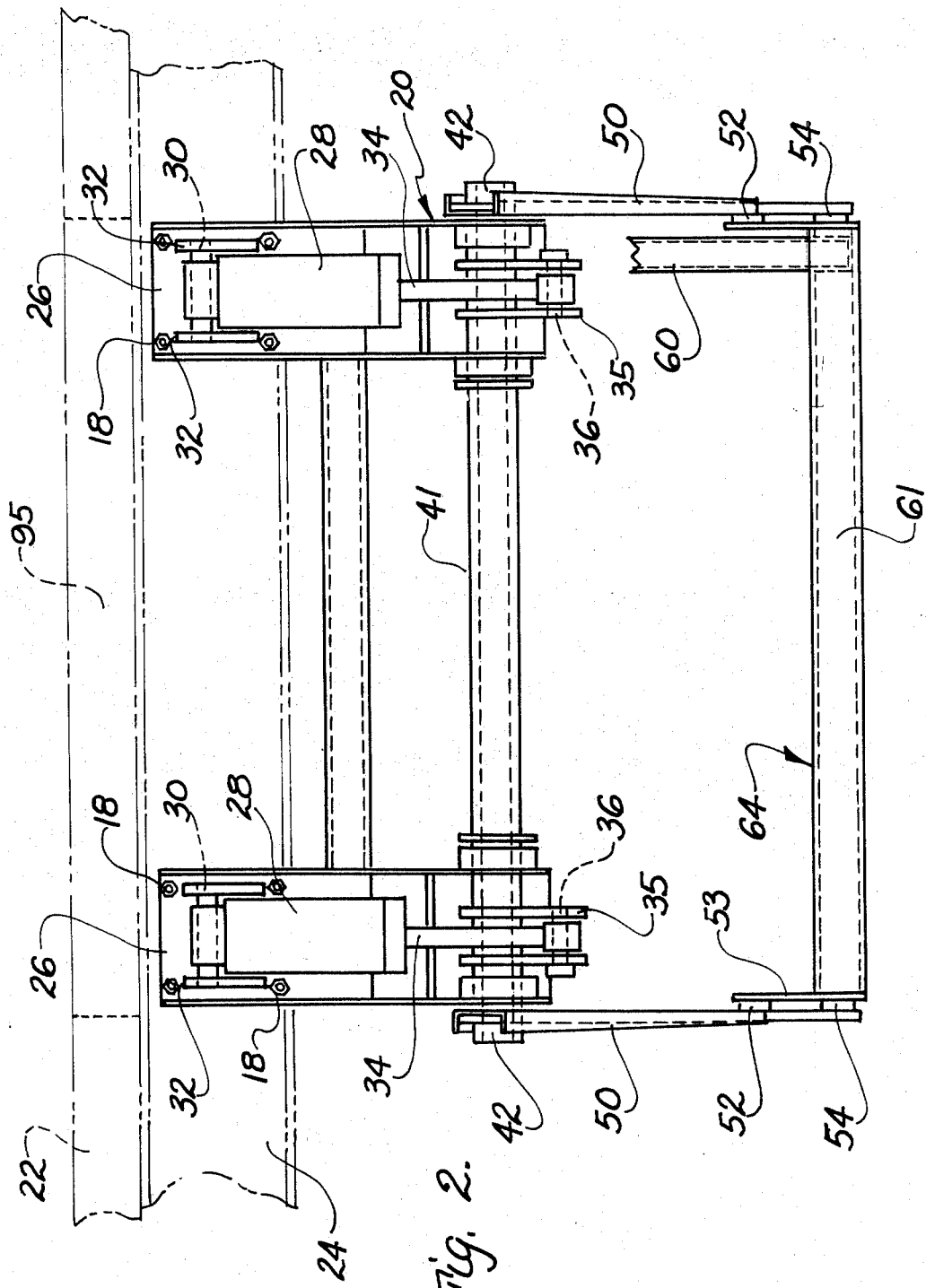

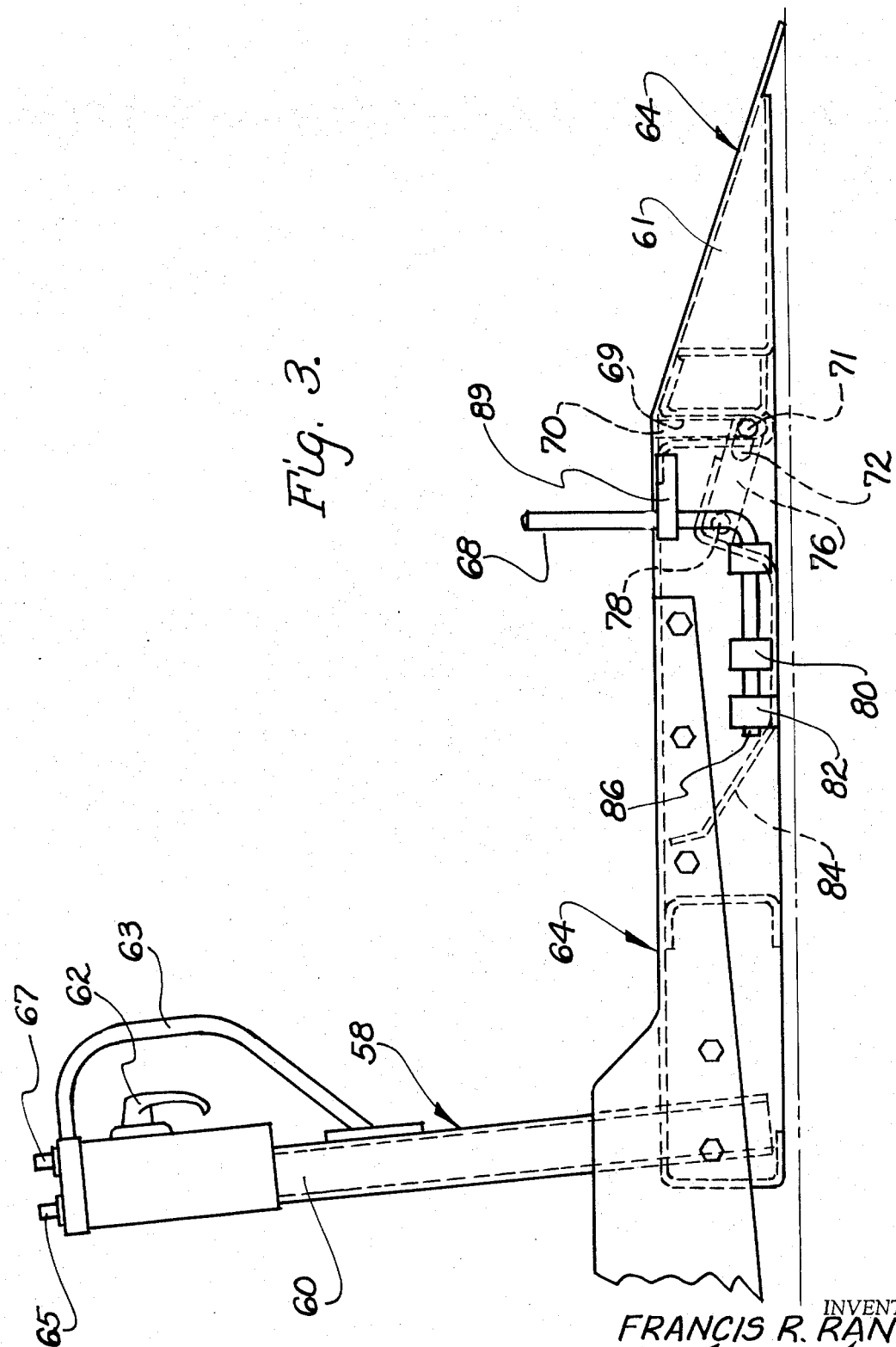

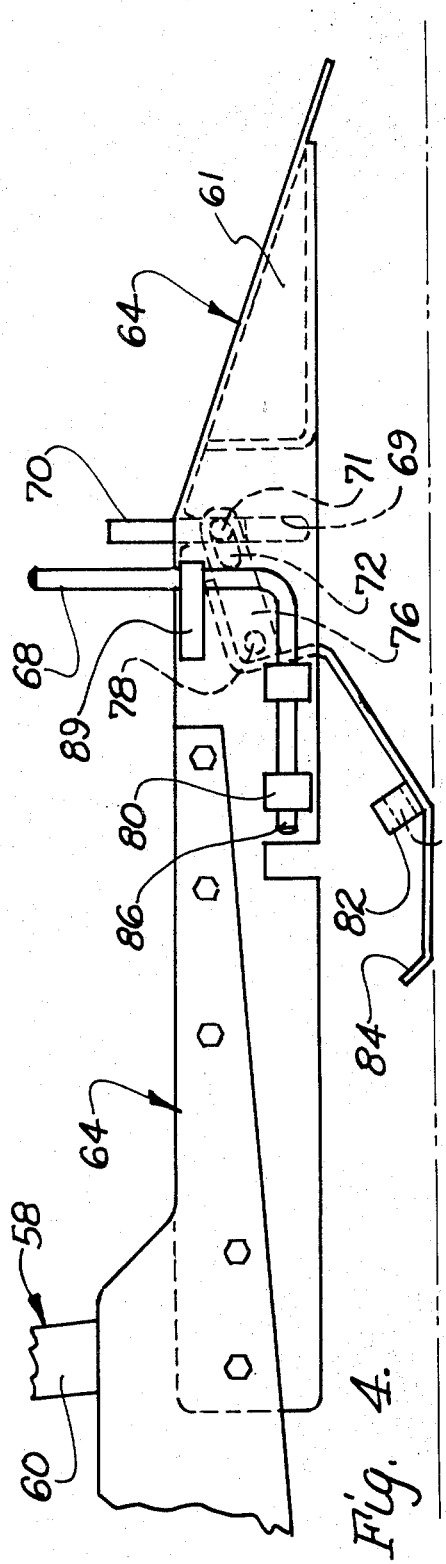
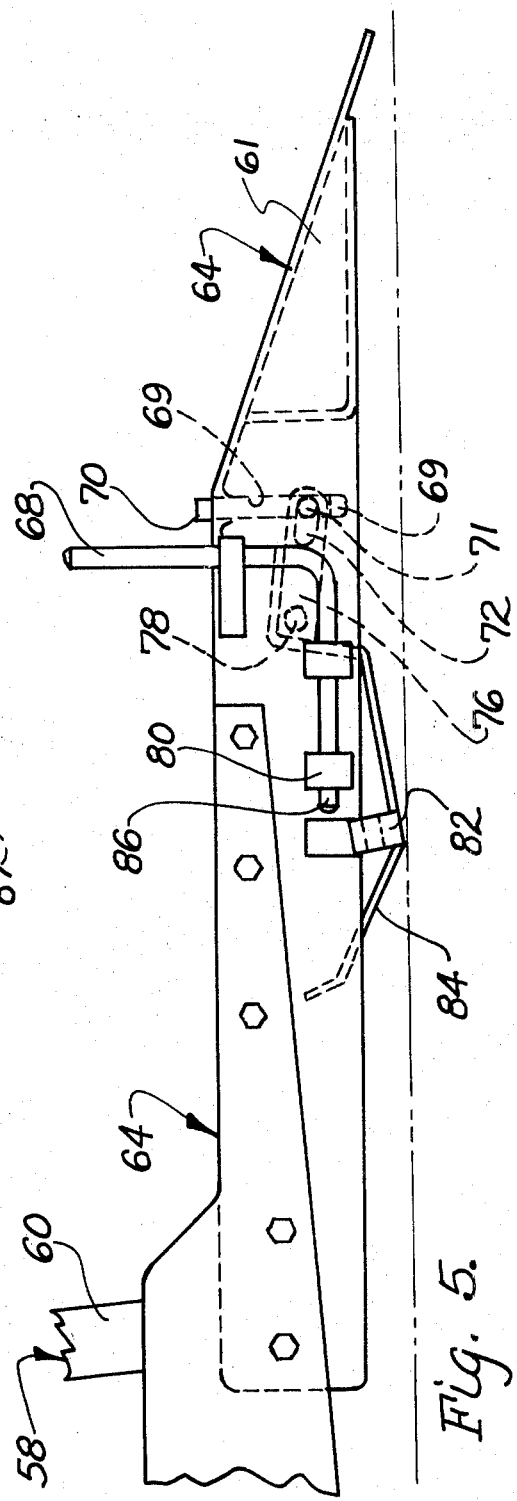

SIDE MOUNT LOADING PLATFORM FOR VAN TYPE TRUCK

This invention relates to loading apparatus and particularly to an improved power operated loader adapted to be mounted on a truck or other vehicle to be loaded.

In general, the loading apparatus of the present invention comprises a power operated lift platform and associated mechanism which are particularly adapted to be mounted on the chassis of a van type truck or other vehicle characterized by a load carrying body enclosed by side panels and provided with a side loading door. Such side panels and door of the enclosure are generally spaced outwardly from the structural side members of the load bearing chassis.

The novel loading apparatus of the present invention is uniquely adapted to be mounted on the side of the chassis frame with the complete loading apparatus being compactly enclosed within the confines of the above mentioned side panels and loading door of the vehicle.

As another aspect of the present invention, the novel loading apparatus is disposed beneath a floor cut-out in the bed of the truck and the mechanism of the apparatus is so arranged that when it is disposed in an upper storage position it functions to form a closure that registers with the above mentioned cut-out in the truck floor.

As still another aspect of the present invention, the novel loading apparatus is characterized by a lift platform of composite construction which permits said platform to be folded and latched in a compact storage position with the complete lift platform disposed inwardly of the above mentioned loading door in the side panel of the vehicle.

As still another aspect of the present invention, the novel lift apparatus comprises a novel power linkage for raising and lowering the lift platform which linkage includes one or more hydraulic cylinders adapted to be mounted outwardly of the chassis frame of the vehicle thereby eliminating the necessity of cutting into or modifying the vehicle's standard chassis frame when the present lift apparatus is mounted thereon.

It is therefore an object of the present invention to provide a novel lift apparatus of compact configuration of which can be mounted or stored within the limited space between the chassis frame and side panel of a van type truck.

It is another object of the present invention to provide a novel lift apparatus of the type described that includes a novel lift platform of composite construction with associated folding and latching apparatus which permits disposition of the lift platform completely within the confines of the side path of the vehicle closure.

It is still another object of the present invention to provide an apparatus of the type described which includes a novel power linkage that permits the motivating power cylinder and all associated apparatus to be mounted in the limited space between the vehicle chassis and the closure formed by the side panel of the vehicle.

Further objects and advantages of the present invention will be apparent from the following description, reference being had to the accompanying drawings wherein a preferred form of embodiment of the invention is clearly shown.

IN THE DRAWINGS:

FIG. 1 is a side elevational view of a loading apparatus construction in accordance with the present invention, with the vehicle to which the apparatus is mounted being partially shown in phantom;

FIG. 2 is a front elevational view of the loading apparatus of FIG. 1;

FIG. 3 is a partial side elevational view of a lift platform comprising a portion of the loading apparatus of the present invention;

FIG. 4 is a second side elevational view corresponding to FIG. 3; and

FIG. 5 is a third side elevational view corresponding to FIGS. 3 and 4.

Referring in detail to the drawings, FIGS. 1 and 2 illustrate the loading apparatus of the present invention with such apparatus being shown mounted on a van type truck, partially illustrated in phantom. The truck includes a conventional chassis frame comprising a longitudinally extending frame side member 24.

The vehicle further includes a floor 22, a side panel and loading door 23, and a floor cut-out or opening 95 between frame side member 24 and door 23.

With continued reference to FIGS. 1 and 2, the loading apparatus includes a loading apparatus frame indicated generally at 20 and mounted to chassis frame side member 24 by means of outer vertical frame members 26 disposed along the outer face of frame member 24 and also by an inner brace 21 disposed along the inner surface of said frame member. Bolts 18 are extended through drilled holes through vertical frame members 26 and vehicle side frame member 24 and inner brace 21.

Loading apparatus frame 20 further includes a transverse torque tube 41 that forms inner pivots 42 for a main lift arm means that comprises spaced main lift arms 56.

With continued reference to FIGS. 1 and 2, the outer ends of main lift arms 56 include outer pivots 54 connected to a lift platform indicated generally at 64. Also, it will be noted two secondary arms 50 are provided and include inner pivots 40 on lift apparatus frame 20 and outer pivots 52 forming connections with upstanding flanges 53 on the lift platform.

It will now be understood that main lift arms 56 and auxiliary arms 50 form a parallelogram linkage between lift apparatus frame 20 and lift platform 64.

The lift arm means just described is actuated by two hydraulic cylinders 28, supplied with pressurized fluid by an associated hydraulic power package including a pump, fluid motor, and appropriate valving, such hydraulic apparatus being of the conventional type and hence not illustrated herein.

It will be noted from FIGS. 1 and 2 that hydraulic cylinders 28 include upper cylinder pivots 30 connecting the cylinder to lift apparatus frame 20 at the flanges 32. Also, rams 34 of hydraulic cylinder 28 are connected to levers 35 welded to torque tube 41, the outer ends of the levers being connected to ram 34 at lower cylinder pivots 36.

It will now be understood that when the lower ends of power cylinders 28 are pressurized, lift platform 64 is raised from the lower load receiving position shown in solid delineation, FIG. 1, to the upper load delivery or storage position shown in dotted delineation.

With continued reference to FIG. 1, lift platform 64 is of composite construction and includes an outer platform portion 61 which is pivotally connected to an inner platform portion 93 at right and left platform pivots 91.

A folding handle mechanism indicated generally at 58 includes a vertical lever 60 the lower end of which is rigidly secured to outer platform portions 61 outwardly of platform pivots 91 and such lever includes an upper handle portion provided with a female latch 55, latch actuator 62 and an actuator guard 63.

When it is desired to swing the outer platform portion 61 to a vertical storage position, shown in dotted delineation in FIG. 1, the folding handle means 58 is utilized by the operator and the female latch 55 is swung arcuately into latched engagement with a male latch portion 51.

When it is desired to unfold the outer platform portion 61, then latch actuator 62 is manually rotated so as to permit disengagement of female latch element 55 from male latch element 51. The platform is then unlocked for swinging movement of lever 60 from the storage position to the load supporting position.

With continued reference to FIG. 1, the top end of folding handle means 58 includes remote cylinder control buttons 65 and 67, with one of such buttons serving to pressurize the lower side of cylinders 28 and the other of said buttons serving to pressurize the upper side of cylinders 28. Such control buttons 65 and 67 actuate conventional electric switches which energize the solenoids of a cylinder control valve which comprise portions of the previously mentioned control circuit not illustrated herein.

Reference is next made to FIGS. 3 - 5 which illustrate in detail a roll-off preventing mechanism comprising a portion of lift platform 64 that functions to retain loading carts on the platform. Such mechanism comprises a vertically shiftable roll-off gate member 70 which is moved between a retracted position of FIG. 3 and an extended position of FIG. 4 with respect to a guide slot 69 by means of a lever pivoted to the platform at 78, the latter comprising a driven arm 76 connected to gate 70 at pivots 71 extended into slots 72 in lever arm 76. The other lever arm 84 is provided with a weight 82 that normally biases such arm in the lower position of FIG. 4 wherein gate 70 is maintained in the raised position.

In normal operation, when platform 64 approaches the ground, FIG. 4, lever arm 84 engages the ground surface prior to platform 64 and as the platform continues downwardly gate 70 is retracted as seen in FIG. 5.

When it is desired to lock roll-off gate in a retracted inoperative position, FIG. 3, then a lock-out lever 68 is shifted inwardly so as to insert lock-out pin 86 into latched engagement with a hole 87 in weight 82.

It should be mentioned that lock-out pin 86 is extended through guides 80 and lock-out lever or handle 68 is mounted for shifting movement by means of a guide 89.

It should be mentioned that roll-off gate 70 is particularly useful where wheeled loading carts are rolled on and off of lift platform 64 in the course of loading the vehicle.

It should be further mentioned that in some instances where the platform is loaded from a dock or curb, lower than the truck but at the same time above the ground, it is then desirable to make roll-off gate 70 inoperative so that the gate will not remain in the extended upper position when the outer end of lift platform 64 is lowered to the dock or curb in which instance lever arm 84 would not have been brought into contact with the underlying road surface so as to retract the roll-off gate as in the case of normal street level loading operations.

I claim:

1. The combination of a vehicle of the type that includes a vehicle frame, a vehicle side panel spaced outwardly from said vehicle frame, a loading door in said side panel and a vehicle floor including a floor opening between said vehicle frame and said loading door; a loading apparatus comprising a lift arm means including an inner end pivotally supported by said vehicle frame and an outer end; lift platform means including an inner platform portion pivotally mounted on said outer end of said lift arm means and adapted to form a closure for said floor opening, and an outer platform portion pivotally mounted on said inner platform portion for swinging movement between a horizontal lift position and a vertical storage position; and power means for swinging said lift arm means to raise and lower said lift platform means between a lower position wherein said platform means is loaded, and an upper position wherein said inner platform portion forms the closure for said floor opening and said outer platform portion is disposed in said vertical storage position inwardly of said vehicle door.

2. The combination of a vehicle of the type that includes a vehicle frame, a vehicle side panel spaced outwardly from said vehicle frame, a loading door in said side panel and a vehicle floor including a floor opening between said vehicle frame and said loading door; a loading apparatus comprising lift arm means including an inner end pivotally supported by said vehicle frame and an outer end; lift platform means including an inner platform portion pivotally mounted on said outer end of said lift arm means and adapted to form a closure for said floor opening, and an outer platform portion pivotally mounted on said inner platform portion for swinging movement between a horizontal lift position and a vertical storage position; and a hydraulic cylinder positioned outwardly of said vehicle frame and operatively connected to said lift arm means for swinging said lift platform means between a lower loading position and an upper storage position, said inner platform portion forming said closure for said vehicle floor opening when said platform means is in said upper storage position.

3. The combination of a vehicle of the type that includes a vehicle frame, a vehicle side panel spaced outwardly from said vehicle frame, a loading door in said side panel and a vehicle floor including a floor opening between said vehicle frame and said loading door; a loading apparatus comprising lift arm means including an inner end pivotally supported by said vehicle frame and an outer end; lift platform means including an inner platform portion pivotally mounted on said outer end of said lift arm means and adapted to form a closure for said floor opening, and an outer platform portion pivotally mounted on said inner platform portion for swinging movement between a horizontal lift position and a vertical storage position; power means for swinging said lift arm means to raise and lower said lift platform means between a lower position wherein said platform means is loaded, and an upper position wherein said inner platform portion forms the closure for said floor opening and said outer platform portion is disposed in said vertical storage position inwardly of said vehicle door; and a folding handle means mounted on said outer platform portion for the manual pivotting of said outer platform to said vertical storage position.

4. The apparatus defined in claim 3 wherein said folding handle means includes a first latch portion that latches with a second latch portion on said inner platform portion when said outer platform portion is disposed in said vertical storage position.

5. The apparatus defined in claim 3 wherein said folding handle means is provided with remote control means for said power means.

6. The combination of a vehicle of the type that includes a vehicle frame including a longitudinally extending vehicle frame side member, a vehicle side panel spaced outwardly from said vehicle frame, a loading door in said side panel and a vehicle floor including a floor opening between said vehicle frame and said loading door; a loading apparatus frame mounted on said vehicle frame side member and including a cylinder mounting flange forming a first cylinder mounting pivot outwardly of said vehicle frame side member; lift arm means including an inner end pivotally mounted on said loading apparatus frame, a second cylinder mounting pivot, and an outer end; lift platform means pivotally mounted on said outer end of said lift arm means and adapted to form a closure for said vehicle floor opening when said lift platform means is in an upper storage position, said lift platform means including an inner platform portion, and an outer platform portion pivotally mounted on said inner platform portion for swinging movement to a vertical storage position within the confines of said loading door; and power cylinder means, including an upper connection with said first cylinder mounting pivot and a lower connection with said second cylinder mounting pivot, for swinging said lift arm means between a lower loading position and said upper storage position.

7. The combination of a vehicle of the type that includes a vehicle frame including a longitudinally extending vehicle frame side member, a vehicle side panel spaced outwardly from said vehicle frame, a loading door in said side panel and a vehicle floor including a floor opening between said vehicle frame and said loading door; a loading apparatus frame mounted on said vehicle frame side member and including a cylinder mounting flange forming a first cylinder mounting pivot outwardly of said vehicle frame side member; lift arm means including an inner end pivotally mounted on said loading apparatus frame, a second cylinder mounting pivot, and an outer end; lift platform means pivotally mounted on said outer end of said lift arm means and adapted to form a closure for said vehicle floor opening when said lift platform means is in an upper storage position, said lift platform means including an inner platform portion, and an outer platform portion pivotally mounted on said inner platform portion for swinging movement to a vertical storage position within the confines of said loading door; power cylinder means including an upper connection with said first cylinder mounting pivot and a lower connection with said second cylinder mounting pivot, for swinging said lift arm means between a lower loading position and said upper storage position; and a folding handle means mounted on said outer platform portion for the manual pivoting of said outer platform to said vertical storage position.

8. The combination of a vehicle of the type that includes a vehicle frame including a longitudinally extending vehicle frame side member, a vehicle side panel spaced outwardly from said vehicle frame, a loading door in said side panel and a vehicle floor including a floor opening between said vehicle frame and said loading door; a loading apparatus frame mounted on said vehicle frame side member and including a cylinder mounting flange forming a first cylinder mounting pivot outwardly of said vehicle frame side member; lift arm means including an inner end pivotally mounted on said loading apparatus frame, a second cylinder mounting pivot, and an outer end; lift platform means pivotally mounted on said outer end of said lift arm means and adapted to form a closure for said vehicle floor opening when said lift platform means is in an upper storage position, said lift platform means including an inner platform portion, and an outer platform portion pivotally mounted on said inner platform portion for swinging movement to a vertical storage position within the confines of said loading door; power cylinder means, including an upper connection with said first cylinder mounting pivot and a lower connection with said second cylinder mounting pivot, for swinging said lift arm means between a lower loading position and said upper storage position; and folding handle means including a first latch portion that latches with a second latch portion on said inner platform portion when said outer platform portion is disposed in said vertical storage position.

* * * * *